3,578,689
ESTER PURIFICATION PROCESS
Eugie A. Martin and Robert J. Fanning, Baton Rouge, La., assignors to Ethyl Corporation, New York, N.Y.
No Drawing. Filed Jan. 10, 1969, Ser. No. 790,471
Int. Cl. C07c 69/00
U.S. Cl. 260—410.9
18 Claims

ABSTRACT OF THE DISCLOSURE

A process is disclosed whereby esters are purified to remove contaminants such as alcohol, fatty acid and residual esterification catalyst by a selected sequence of contacting operations under selected conditions while avoiding conditions found to be conducive to the formation of emulsions and gels and while avoiding conditions that require the manipulation of large quantities of various washing streams conducive to losses of esters.

BACKGROUND OF THE INVENTION

Field of the invention

This invention relates to the preparation of esters of organic acids and organic alcohols having minimum contamination by residual esterification materials. In particular, it relates to purification procedures whereby contaminants are removed effectively, at moderate temperatures, and with low volume washing streams to minimize losses and simplify ancillary equipment involved in handling such side streams.

Preferred esters are lower alkyl esters of alkanoic acids wherein the alkyl groups contain from 1 to about 6 carbon atoms and wherein the acid contains from about 6 to about 20 carbon atoms. The preferred esters are those which are liquid at 0–100° C., and which are virtually insoluble in water.

Most preferred esters are of the formula

where R' and R are normal alkyl radicals, especially those where R' is 1–6 carbons and R is 7–15 carbons.

The purification of esters of the foregoing types to the extent that the only significant contaminant is about ²⁄₁₀ of one percent or less fatty acid or alkyl halide or, other "acid" component reactant, with negligible content of excess "alcohol" component reactant, negligible content of esterification catalyst material and negligible content of saponification reagent such as caustic represents a problem that has not really been satisfactorily solved on large scale in the prior art. The removal of excess fatty acid reactants from esters is particularly difficult.

Unfortunately, most reagents and conditions capable of effective saponification of free fatty acids also brings about at least a partial hydrolysis of esters resulting in losses of esters through the formation of free alcohols in the esters. Such hydrolysis can occur even where all of the residual acid reactants are not removed from the system by the saponification.

In addition, when such caustic saponification materials are used, residual saponification materials must be removed. Thus, in general, the ordinary use of saponification agents does not accomplish the desired purpose and, in many instances, creates other problems which are of a magnitude even greater than the initial ones sought to be solved.

Another problem frequently encountered in such prior art purification operations is the problem connected with the formation of emulsions and gels. Water soluble alcohols plus virtually insoluble esters lead to troublesome emulsions with water in many instances requiring careful handling and proportioning of streams. Thus, in many cases the development of a suitable technique for purifying esters requires some trial-and-error experimentation seeking techniques, proportions, temperatures, etc. that provide the desired results and minimize undesired results. In general, prior art processes leave much to be desired when dealing with esters of the types involved herein.

SUMMARY

In accordance with the teachings of the present invention, a process is provided for purifying esters to remove residual reactants and catalyst materials involving several discrete and distinct contacting steps in carefully controlled sequence, coordination, proportioning and combinations of materials present at each step to minimize the quantities of the materials to be handled at each step as well as overall, maintaining close control of conditions as to avoid emulsions that are prevalent when dealing with materials of the types involved herein.

The process uses a series of treatment steps involving contacting an ester phase with added aqueous alcoholic solution, such solution containing ancillary materials in certain instances, each such contacting step being followed by a separation of an ester phase from an aqueous phase.

Each contacting step is accomplished in a mixer. One suitable mixer system involves blending the feed at the inlet to a rotary pump such as a centrifugal, gear, or vane pump, and passing the materials through the pump while the pump is in operation. Another suitable system is a stirred pot using a propeller or turbine type mixer blade in rotary or oscillatory motion.

Each separation typically employs a gravity separator such as a sedimentation or decantation vessel. Other suitable arrangements include centrifugal apparatus.

The contacting and separation operations are at similar or different temperatures from about 25° C. to about 125° C., at atmospheric pressure or autogenous pressure. Temperatures in the upper region, typically 100–125° C. are preferred in some instances to alleviate stubborn emulsion problems. Temperatures somewhat lower, typically 75–100° C. are preferred in some instances, particularly with the lower alcohols to facilitate operation at atmospheric pressure. Typical specific temperatures for systems containing specific alcohols or corresponding R' (alkyl group) components in the esters, whichever has the higher vapor pressure, are 65° C. for methyl alcohol contacting solutions and for methyl esters, 90° C. for ethyl alcohol solutions and for ethyl esters, 95° C. for isopropyl alcohol solutions and isopropyl esters and 105° C. for butyl alcohol solutions and butyl esters.

Particularly preferred basic material for the base treating step is sodium carbonate whereas particularly preferred acid for the acid treating step is sulfuric acid.

Typical esters treated in accordance with the teachings of the present process include methyl hexanoate, methyl heptanoate, methyl octanoate, methyl nonanoate, methyl decanoate, methyl undecanoate, methyl dodecanoate, methyl tridecanoate, methyl tetradecanoate, methyl pentadecanoate, methyl hexadecanoate, methyl heptadecanoate, methyl octadecanoate, methyl nonadecanoate and methyl icosonoate.

Other typical esters include esters having "acid" carbon skeletal structures (RC≡) similar to those of the preceding paragraph but which have the following "alcohol" carbon skeletal structures (R'≡) substituted for the methyl ester component recited in the preceding paragraph; ethyl, n-propyl, isopropyl, n-butyl, isobutyl, sec-butyl, t-butyl. Included also are the "normal alcohol"

designations pentyl esters and hexyl esters plus the various branched and secondary structural isomers thereof. Exemplifying typical esters in this category is isopropyl tetradecanoate or isopropyl myristate. Other typical esters are ethyl decanoate, n-propyl dodecanoate, n-butyl octanoate, isoöctyl nonanoate, sec-butyl dodecanoate, and t-butyl hexanoate.

Included also as typical esters treated in accordance with the teachings of the present invention are those corresponding to those of the foregoing two paragraphs wherein the "acid" structures are branched. A typical representation of esters in this category is methyl 2-ethyl hexanoate.

The contacting operations involve the addition of aqueous alcoholic solutions. The quantity of such materials is held as low as possible to minimize losses and volume of streams, 10–50 percent of the ester phase by weight, with lower quantities, 10–20 percent even more preferred to minimize losses of ester in such materials. In the final contacting step, quantities of such materials even as low as 5 percent by weight are suitable and desirable. As a fundamental preference for the broad range of esters, a quantity of 33 percent by weight of such materials relative to the ester phase is desired.

In the contacting steps alcoholic solutions are used to assist in the control of emulsions. To minimize transesterification problems, the alcohol constituency of the alcoholic solutions is selected to correspond to the "alcohol" carbon skeletal structures of the esters being treated. Thus methyl alcohol-water solutions are usually preferred for treating methyl esters, isopropyl alcohol-water solutions for treating isopropyl esters, and so forth for the various esters included herein. An additional factor connected with this point is that, where transesterification is not a problem, a preferred choice for the alcohol of the alcoholic solution is a low cost alcohol such as methyl alcohol or isopropyl alcohol. Thus, for example, methyl or isopropyl alcohol is preferred for the solutions where permissible when processing ethyl esters or butyl esters.

The proportions of the alcohol and water in the solutions are significant from the standpoint of minimizing emulsions and preferably involve from about 15 to about 25 percent by weight of alcohol in the solutions based on the water, with about 20 percent most preferred. The controlling aspect with regard to this ratio is the alcohol/water ratio in the contacting mixtures but as a practical matter the content of alcohol and water in the ester phases fed to the various treating stages usually is so small (2–5 percent) as to provide no significant difference. For the most part, under usual conditions, it is appropriate to specify proportions on a basis of the aqueous alcoholic contacting material fed to each contacting operation as involving about 15–25 percent alcohol by weight based on the water, preferably 20 percent. The main consideration relative to these preferred proportions is that they alleviate tendencies toward the formation of troublesome gels and emulsions. Alcohols used are preferably those which have at least a water solubility at the temperature of the operation of 25 percent by weight based on water.

DISCUSSION

In many instances a preliminary step is used which comprises contacting the esters with a prescribed quantity of water to remove a significant portion of the water soluble materials, particularly mineral acid catalysts for the usual types of esterification reactions as well as to remove water-soluble reactants, particularly alcohols, which in general constitute the principal class of water-soluble reactants involved in many cases when dealing with the esters of the types involved herein.

As discussed above, the quantity of the water involved in the washing preliminary step is critical to the extent that it is desired to avoid ester solubility losses in large volumes of ancillary water phase recirculating streams that must be handled in and subsequent to the separation steps. Thus, the fundamental requirement is established as for the principal contacting steps, that the quantity of water used in such a preliminary water washing step is from about 10 to about 50 percent by weight, preferably about 33 percent, of the typical esters treated which, for example, contain about 2–7 percent water-soluble materials. In general, operation in this range depends to some extent upon the amount of water-soluble contaminants present in the esters and upon their solubility as well. With esters containing a higher percentage of water-soluble impurities than the five percent level, operation in the upper portion of the quantity range from 25–50 percent is desired. Conversely, where the quantity of water-soluble contaminants in the esters is less than five percent, typically down to about 2.5 to 3 percent, one obtains suitable desirable results and minimizes the volume of the aqueous streams that must be handled by operating in the lower portion of the range at about 10–20 percent by weight.

The temperature of this treatment is preferably from about 25° C. to about 125° C., with temperatures of about 75 to about 100 even more preferred, to provide a good combination of desired physical conditions and solubilities. Similar temperature considerations prevail for subsequent contacting steps (a), (b), (c) and (d).

This contacting includes a separation between aqueous and ester phases by gravity processes such as decanting, centrifuging, or the like. Each separation and each contacting step is preferably performed in a separate vessel; however, in a batchwise sequence the same vessel and other equipment may be used for each of the separations. This preliminary contacting is a part of the particularly preferred mode of carrying out the invention especially where the esters are produced from alcohol and acid. In some instances this step is omitted and the process is started with the following step (a).

In the first principal step (a) of the process, the ester phase is contacted with an aqueous alcoholic solution of a base at a pH above about 11 to react with at least part of the impurities and the resulting ester phase is separated from an aqueous phase. The purpose of this step is to saponify residual organic acid.

The makeup and proportions of the materials used in the base treatment contacting step (a) are critical within the ranges specified hereinafter to control emulsions although a moderate variation within the limitations and purposes clearly set forth herein is permissible and normally to be expected. A prime consideration for this base treatment step involves the selection of base materials which are strong enough to saponify the free fatty acid that are present in the system but which are not so strong as to enhance hyrdrolysis of esters. Also important is that the basic materials must be capable of providing a mixture pH of about 11–12 in fairly concentrated aqueous solutions to avoid excessive dilution. Thus, strong bases such as NaOH and KOH alone, are not suitable to meet the requirements of pH and water proportions set forth.

Typical basic materials suitable for use in connection with the present invention are sodium carbonate, a buffered mixture of $Na_2HPO_4$ and NaOH, and a buffered mixture of $NaHCO_3$ and $K_2CO_3$. Such buffered mixtures are descirbed in Handbook of Chemistry and Physics, Chemical Rubber Publishing Co., Cleveland, Ohio, 44 ed., 1962, pp. 1717–1720, which is incorporated herein by reference.

In most cases where the preliminary contacting of washing is omitted, it is necessary to increase the amount of base of step (a) to maintain the specified pH.

The base-treating step (a) includes a separating step involving considerations and conditions similar to the separating previously discussed providing an ester phase containing small quantities of water, alcohol, base and base reaction products such as soaps, olefins or alcohols.

The ester phase from (a) is subjected to contacting (b) with an aqueous alcoholic solution to remove a part of residual water soluble impurities and base remaining from step (a) and the resulting ester phase is separated from the associated aqueous phase for processing in a third contacting (c).

In (c) the ester phase produced at (b) is contacted with an aqueous alcoholic solution of an acid having a degree of ionization between about 50 percent and 100 percent to bring the pH to from about 3 to about 5 to neutralize residual base and the resulting ester phase is separated from the associated aqueous phase for processing in a fourth contacting step (d).

The purpose of step (c) is mainly neutralization of residual quantities of base remaining in the ester phase. The desirability of the acid-treatment step is concerned primarily with control over the degree of purification and the quantities of materials that must be handled. In some instances, this step can be deleted and the preceding dilution step expanded in quantity of treating material above 40 percent up to about 60 percent; however, this is less preferred within the concept of the present invention because of the increase in the amount of aqeous alcohol solution required in the dilution-treating step under such conditions and the consequent increase in ester losses.

The makeup and proportions of the materials in the acid-treatment step are critical to some extent in that excessive acidity complicates succeeding processing and may actually promote the hydrolysis of the esters that are involved. Again, the important point with regard to this step is neutralization of residual base, not the actual creation of a strongly acid condition so that the preference at this step is for a situation wherein the system involved in the acid-treating step has a pH of from 3 to about 5.

Preferred acids for step (c) are those having a degree of ionization between about 50 percent and 100 percent. The concentration of the acid is not particularly critical but is desirably high to minimize water volume and is dependent on the amount of acid required to produce the specified pH with the dilution specified when starting with the specified feed to the step. Typical acid concentrations range from about 2 to about 10 percent by weight based on the water.

Acids particularly preferred are those which are much more soluble in water than in the esters being treated.

Typical mineral acids used are $H_2SO_4$, $H_2SO_3$, $HNO_3$, HCl, HBr, HI and $H_3PO_4$. Typical acidic salts such as alum (0.1 N solution) are suitable. A strong organic acid such as oxalic is suitable.

In step (d) the ester phase produced at (c) is contacted with an aqueous alcoholic solution to remove at least a part of the acid remaining from step (c) and the resulting ester phase is separated from the associated aqueous phase for use as product or for further purification. This ester phase contains near "neutral" esters plus small quantities of alcohol and water. These esters are substantially free of residual esterification catalysts and fatty acid. The fatty acid in usual examples is 0.2 percent by weight or less.

As a summary for the foregoing contacting steps (a), (b), (c) and (d), these operations are conducted at temperature in the range of about 25° C. to about 125° C.; the aqueous alcoholic solutions have from about 15 to about 25 percent by weight of alcohol, based on the water, having up to about 6 carbon atoms per molecule; and the aqueous alcoholic solutions are used in proportions of from about 10 percent to about 50 percent by weight of the ester phase.

In those instances where the content of residual alcohol and water described in the ester phase product of step (d) is objectionable, the removal thereof is accomplished in a drying step preferably assisted by reduced pressure conditions and somewhat elevated temperatures. As a practical matter, one usually prefers vaporization at moderate temperatures and moderate reduced pressures so as to achieve an effective drying and removal of alcohol without the need for temperatures in excess of about 100° C. Higher temperatures in some instances cause the degradation of the esters in various ways such as the development of color bodies. Alternatively, adsorption or absorption techniques, with materials such as silica gel, diatomaceous earth and montmorillonite materials are useful for drying. Although the drying step is frequently performed as a part of the present process, it is not included as an essential component thereof since a significant utility exists for the esters of moderate water content as obtained from a simple gravity separating step, for example, in perfumery operations.

The principles of the present invention are useful in purifying esters of the identified types without limitation to any particular method by which the esters are produced. It is well known, for example, that esters may be produced in numerous ways as, for example, (1) by the action of an acid on an alcohol in the presence of hydrogen ion and some means for the removal of water; (2) by the action of salts of very active or heavy metals on alkyl halides; (3) by the action of acid chlorides on alcohols; (4) by the action of acid chlorides on alkoxides; (5) by the action of acid anhydrides on alcohols; (6) by the catalytic condensation of aldehydes; (7) by the dehydrogenation of alcohols; and (8) by the isolation of fats, fatty oils, waxes and lipides from natural products.

Of the foregoing processes for the preparation of esters, that relating to the action of an acid on an alcohol is selected for further exemplification as involving catalysis by hydrogen ion as obtained from various acids such as $H_2SO_4$, HCl, HF, HI, $HNO_3$, $H_3PO_4$, oxalic as well as aluminum sulfate and other such salts. Typically, such an esterification reaction employs such a catalyst in a proportion of from about 2 to about 15 percent by weight of the fatty acid employed in the reaction and the reaction is conducted at a temperature of the order of 150 to 250° F. at atmospheric or autogeneous pressure. Although the means for the removal of water is not of any great criticality, such removal is frequently facilitated by permitting the water produced to vaporize from the reaction mass. In some instances, provision for economizing with regard to the recovery and return of certain of the reactants removed from the system in the vaporization is desirable.

From the above recitation, it is observed that the hydrogen ion material exemplified in the typified esterification process involving the action of an acid on an alcohol is substantially the same as the acid exemplification for the acid treating step of the present process. This provides considerable significance in obtaining coordination of processing through the combination of an acid-treating step which employs the same acid as that used in the esterification process. Thus, such a combination presents a particularly desired combination within the scope of the present process involving the coordination of the esterification operation as the action of an acid on an alcohol in the presence of an acid which corresponds to the acid employed in the acid treatment process. A particular advantage of performing the combination just recited is that there is a considerable economy involved in the handling of the ancillary or aqueous streams which is a particularly important factor in those situations wherein azeotropic mixtures are encountered.

EXAMPLE I

The process of the present invention was performed in a batchwise manner employing a stirred 5-liter round bottom creased three-neck Pyrex flask having a bottom drain cock. The flask was provided with a compressed air driven turbine motor to drive the stirrer giving good agitation and with temperature control to maintain the desired reaction and treatment temperatures.

To the flask described above was added esterification product mixture produced as in Example IV by esterifying acids and alcohols with sulfuric acid as a catalyst.

The mixture contained 1000 grams (g.) of 97–98 mol percent methyl esters and 3–2 mol percent of fatty acids. In addition to this, the mixture fed to the equipment included 1280 g. methyl alcohol, 100 g. water and 220 g. sulfuric acid. On standing, this mixture separated into two phases of approximately equal volume, an upper ester phase and a lower aqueous phase.

To the foregoing mixture maintained at about 70° C. was added 500 g. water at 70° C. The mixture was stirred for three minutes in a preliminary contacting step. The agitation was stopped and the phases allowed to separate. The aqueous phase was drained off and set aside leaving an upper ester phase.

To the ester phase was added 500 g. of a 5 wt. percent solution of sodium carbonate in 80/20 wt. percent water/methanol solution. Temperatures again were 70° C. The agitation was started and the mixture stirred vigorously for three minutes in step (a). The agitator was stopped, the phases allowed to separate and the water phase drained and set aside.

To the organic (ester) phase from the preceding step was added 300 g. 80/20 water/methanol solution at 70° C. The mixture was stirred three minutes in step (b) at 70° C. following which the agitation was stopped, the phases allowed to separate and the water phase drained and set aside.

To the organic (ester) phase from the preceding step was added 200 g. 80/20 water/methanol solution containing sulfuric acid providing a pH of 3.0 for the water/methanol solution. The mixture was stirred three minutes in step (c) at 70° C., the agitation stopped, the phases allowed to separate and the water phase drained and set aside.

To the organic phase from the preceding step was added 300 g. 80/20 water/methanol solution at 70° C. The mixture was stirred three minutes in step (d). The agitation was stopped, the phases separated and the water phase drained and set aside.

The wet alcoholic ester phase product of the preceding step, about 1000 g. methyl esters, was then vacuum dried at 90° C. and 5 mm. Hg to remove the residual methyl alcohol and water providing an ester product which analyzed as follows:

Acid number _____ 0.19 milli-g. KOH/g.
Ester value _____ 244 milli-g. KOH/g.
Water _____ 0.014 wt. percent
Hydroxyl value _____ <0.01 wt. percent (—OH)

EXAMPLE II

A preferred embodiment of the principles of the present invention employs an impure ester feed stream such produced in subsequent Example IV. Such a stream, at the hourly rate of 639 lbs. is typically fed continuously through a sequence of five contacting steps [preliminary+(a)+(b)+(c)+(d)] in five mixers such as centrifugal pumps, each step including a separation or startification chamber and operation following the contacting. Ester and aqueous phases are obtained from each separation. The ester phase feed to each contacting step is to the input of the respective pump. Each pump is an ordinary centrifugal pump of one inch nominal pipe size, driven at 1725 r.p.m. with output throttled by a control valve to maintain the specified flow rate. Ester phase feed to the preliminary contacting step of water washing includes, on an hourly basis, 20 lbs. water, 7 lbs. fatty acid, 258 lbs. methyl esters, 304 lbs. methyl alcohol and 50 lbs. sulfuric acid. The ester feed stream is at a temperature of 70° C. It is combined in the pump with a stream of water at 70° C. in the quantity of 100 lbs.

The ester phase from the separation of the preliminary contacting step is a total of 291 lbs. containing 1 lb. water, 7 lbs. fatty acid, 258 lbs. methyl esters, and 25 lbs. methyl alcohol. The aqueous phase from the first separation contains 119 lbs. water, 279 lbs. methyl alcohol and 50 lbs. sulfuric acid for a total of 446 lbs.

The ester phase of 291 lbs./hr. from the first separation is fed to step (a) together with 108 lbs. water, 27 lbs. methyl alcohol and 5 lbs. sodium carbonate. The step (a), like the preliminary washing step, is performed in a centrifugal pump. The effluents from the separation of step (a) include a minor quantity of about 1 lb. $CO_2$ plus 266 lbs. ester phase and 164 lbs. aqueous phase materials. The ester phase contains a trace of sodium soaps, a trace of sodium carbonate, 0.2 lb. fatty acid, 258 lbs. methyl esters, 1 lb. water and 6 lbs. methyl alcohol. The 164 lbs. of aqueous phase materials from the separation of step (a) contains 109 lbs. water, 2 lbs. sodium carbonate, 7 lbs. sodium soaps and 46 lbs. methyl alcohol.

The ester phase from step (a) is delivered to step (b) wherein it is treated with an aqueous alcoholic stream containing 64 lbs./hr. water and 16 lbs./hr. methyl alcohol.

Step (b), like step (a) and the preliminary step, typically employs a centrifugal pump mixing stage. The separation of step (b) employs apparatus similar to that of the previous separations providing a step (b) ester phase effluent of 266 lbs. containing a trace of sodium carbonate, 0.2 lb. fatty acid, 258 lbs. methyl esters, 1 lb. water and 6 lbs. methyl alcohol. The aqueous phase from the step (b) separation amounts to 80 lbs. containing a trace of sodium soaps, 16 lbs. methyl alcohol and 64 lbs. water.

The ester phase of 266 lbs. from step (b) is mixed with acidic aqueous alcoholic solution in step (c). The quantity of acidic aqueous alcohol in solution is 40 lbs. containing 8 lbs methyl alcohol, 31.5 lbs. water and 0.5 sulfuric acid.

Step (c) employs a centrifugal pump mixer like the preceding steps, mixing the aqueous solution with 266 lbs. of ester phase material from step (b). Step (c) employs a separator similar to that of the previously described steps providing a step (c) ester phase effluent of 266 lbs. containing 0.2 lb. fatty acid, a trace of sulfuric acid, 258 lbs. methyl esters, 1 lb. water, and 6 lbs. methyl alcohol. The aqueous phase effluent from step (c) is 40 lbs. containing a trace of sodium sulfate, a trace of sulfuric acid, 31.5 lbs. water and 8 lbs. methyl alcohol.

In step (d) the ester phase from step (c) is mixed with 80 lbs. of aqueous alcoholic solution employing a centrifugal pump mixer system like the preceding steps. The effluent from step (d) is provided in separate ester and aqueous phases producing a step (d) aqueous alcoholic product ester phase of 266 lbs. containing 0.2 lb. fatty acid, 258 lbs. methyl esters, 1 lb. water and 6 lbs. methyl alcohol. The aqueous phase from step (d) is 80 lbs. containing a trace of sulfuric acid, 64 lbs. water and 16 lbs. methyl alcohol.

To produce a dried alcohol-free ester product, the ester phase from the preceding step (d) is heated at 200° F. and 0.1 p.s.i.a. for five minutes. Dried product is 258 lbs. methyl esters and 0.2 lb. fatty acid with traces, less than 0.1 lb. each, of water and methyl alcohol.

EXAMPLE III

Example II is repeated with feed of the ester directly to contacting step (a). The base solution feed (hourly) is increased to 480 lbs. water and 85 lbs. sodium carbonate. The sodium carbonate may be substituted by 40 lbs. sodium hydroxide plus 29 lbs. of sodium carbonate. In this instance the base solution does not require methyl alcohol, the excess carried over from the ester feed being adequate. Provision is required for release of 24 lbs. of $CO_2$ from step (a).

The ester phase from step (a) is then processed through steps (b), (c) and (d) as in Example II, with aqueous alcoholic product taken from step (d) and anhydrous product taken after a drying step similar to that Example II. The ester products of this example are similar to the corresponding ones of Example II.

EXAMPLE IV

A typical ester stream for treatment in accordance with the principles of the present process is produced by the reaction of fatty acid and alcohol. A continuous flow process is typically employed with a stirred, heated reaction vessel having a liquid capacity of approximately ½ the hourly feed rate of the materials provided giving an average contact time of 30 minutes. The vessel is maintained at 90° C. under autogenous pressure of about 50 lbs./sq. in. gauge. To the stirred reactor vessel is fed 249 lbs. fatty acid having an average molecular weight of 212 which in this instance corresponds to a distribution of approximately 65 wt. percent dodecanoic acid, 25 wt. percent tetradecanoic acid and 10 wt. percent hexadecanoic acid. Also fed to the reaction vessel in this instance is 340 lbs. methanol and 50 lbs. sulfuric acid for a total of 639 lbs. reactants and catalyst.

The ester effluent stream contains 258 lbs. methyl esters of the fatty acids, 304 lbs. methyl alcohol, 7 lbs. unreacted fatty acids, 50 lbs. sulfuric acid and 20 lbs. water. This constitutes an impure ester stream suitable for purification in accordance with the procedures of the present invention. Generally, similar streams are provided by other esterification processes outlined herein and with others of the organic acids, alcohols and esterification catalysts exemplified in the discussion. With secondary, with branched, and with tertiary alcohols, increased average reaction times are generally required in the esterification step because of slower reaction rates. With other reactant materials for other esterification processes, such as the alkyl halides, the contacting steps may perform various operations such as hydrolysis yielding various other materials, typically alcohols and olefins that are removed in the sequence of purification operation.

EXAMPLE V

Examples IV and II are repeated to produce ethyl esters of the mixed fatty acids of Example IV.

The typical esterification procedure is continuous employing on an hourly basic 460 lbs. ethyl alcohol, 212 lbs. of the typical mixed fatty acids described in Example IV and 50 lbs. sulfuric acid in a reaction at 100° C., at 50 p.s.i.g., for 30 minutes average residence time.

The esterification effluent contains 415.4 lbs. ethyl alcohol, 6.4 lbs. fatty acids, 232.8 lbs. ethyl esters, 50 lbs. sulfuric acid and 17.4 lbs. water.

The foregoing esters are treated in the preliminary contacting step of a preferred five-step contacting process with 100 lbs. per hour of water at 70° C. The two effluent phases from the preliminary contacting include an ester phase containing 40 lbs. ethyl alcohol, 6.4 lbs. fatty acids, 232.8 lbs. ethyl esters, 1 lb. water and a trace of sulfuric acid. The aqueous phase effluent from the preliminary step includes 375.4 lbs. ethyl alcohol, 116.4 lbs. water and 50 lbs. sulfuric acid.

In step (a) the ester phase from the preliminary step is contacted with 108 lbs. water, 27 lbs. ethyl alcohol, and 5 lbs. sodium carbonate to provide an ester phase from step (a) containing 20 lbs ethyl alcohol, 232.8 lbs. ethyl esters, 1 lb. water, 0.2 lb. fatty acid, a trace of sodium soap and a trace of sodium carbonate. The aqueous phase from the step (a) contains 108 lbs. water, 47 lbs. ethyl alcohol, 2 lbs. sodium carbonate, 1 lb. carbon dioxide and 7 lbs. sodium soaps of the fatty acids.

In step (b) the ester phase form the preceding step (a) is contacted with 64 lbs. water and 16 lbs. ethyl alcohol at 70° C. to provide an ester phase of 16 lbs. ethyl alcohol, 232.8 lbs. ethyl esters, 1 lb. water, 0.2 lb. fatty acid and a trace of sodium carbonate. The aqueous phase from step (b) contains 20 lbs. ethyl alcohol, 64 lbs. water, a trace of sodium soap of the fatty acid and a trace of sodium carbonate.

In step (c), the ester phase from the preceding step (b) is contacted with 32 lbs. water, 8 lbs. ethyl alcohol and enough sulfuric acid (1 lb. or less) required to produce a pH of about 3.0 in the treating material added. The effluents from step (c) include an ester phase which contains 16 lbs. ethyl alcohol, 232.8 lbs. ethyl esters, 1 lb. water, 0.2 lb. fatty acid and a trace of sulfuric acid. In addition, step (c) effluents include an aqueous phase containing 8 lbs. ethyl alcohol, 32 lbs. water, a trace of sulfuric acid and a trace of sodium sulfate.

The ester phase from step (c) is contacted in step (d) with 64 lbs. water and 16 lbs. ethyl alcohol to produce an ester phase effluent containing 16 lbs. ethyl alcohol, 232.8 lbs. ethyl esters, 1 lb. water and 0.2 lb. fatty acid. The aqueous phase from step (d) contains 64 lbs. water, 16 lbs. ethyl alcohol and a trace of sulfuric acid.

The ester phase from the fifth contacting stage (d) is an aqueous alcoholic product. Where anhydrous esters are desired, the product is dried as in previous examples for similar desirable results after analysis.

EXAMPLE VI

Example V is repeated for isopropyl esters in place of ethyl esters. The following streams and components are listed on an hourly basis.

In the esterification reaction 600 lbs. isopropyl alcohol, 212 lbs. of mixed fatty acid described in Example IV and 50 lbs. sulfuric acid are fed and mixed at 100° C., 50 p.s.i.g., for an average residence time of 60 minutes.

Esterification product includes 541.8 lbs. isopropyl alcohol, 6.4 lbs. fatty acid, 246.4 lbs. isopropyl esters, 50 lbs. sulfuric acid and 17.4 lbs. water.

In the preliminary contacting stage, the ester material is contacted with 100 lbs. of hot water at 70° C. and separation is made into ester phase and aqueous phase effluents. The ester phase effluent from this preliminary contacting step contains 60 lbs. isopropyl alcohol, 6.4 lbs. fatty acid, 246.4 lbs. isopropyl esters, 1 lb. water and a trace of sulfuric acid. The aqueous phase effluent from the preliminary contacting step includes 116.4 lbs. water, 481.8 lbs. isopropyl alcohol and 50 lbs. sulfuric acid.

The ester phase from the preliminary contacting step is delivered to contacting (a) wherein it is mixed at 70° C. with 108 lbs. water, 27 lbs. isopropyl alcohol and 5 lbs. sodium carbonate and separted into ester and aqueous phases.

The ester phase effluent of contacting (a) includes 30 lbs. isopropyl alcohol, 0.2 fatty acid, a trace of sodium soap, 246.4 lbs. isopropyl esters, 1 lb. water and a trace of sodium carbonate. The aqueous phase from contacting (a) includes 57 lbs. isopropylalcohol, 108 lbs. water, 2 lbs. sodium carbonate, 1 lb. carbon dioxide and 7 lbs. sodium soaps of the fatty acids.

The ester phase from contacting (a) is delivered to contacting (b) wherein it is mixed with 64 lbs. water and 16 lbs. isopropyl alcohol and separated into ester and aqueous phase.

The effluent from contacting (b) includes an ester phase containing 25 lbs. isopropyl alcohol, 246.4 lbs. isopropyl esters, 0.2 lb. fatty acid, 1 lbs. water and a trace of sodium carbonate. The aqueous phase from (b) contains 21 lbs. isopropyl alcohol, 64 lbs. water, a trace of sodium soap and a trace of sodium carbonate.

The ester phase from (b) is delivered to contacting (c) wherein it is mixed with a stream containing 32 lbs. water, 8 lbs. isopropyl alcohol and a trace of sulfuric acid required to produce therein a pH of about 3.0 and then is separated into ester and aqueous phases. The effluent from (c) includes an ester phase containing 25 lbs. isopropyl alcohol, 246.4 lbs. isopropyl esters, 0.2 fatty acids, 1 lb. water and a trace of sulfuric acid. The effluent aqueous phse from (c) contains 8 lbs. isopropyl alcohol, 32 lbs. water, a trace of sulfuric acid and a trace of sodium sulfate.

The ester phase from (c) is delivered to contacting (d) wherein it is mixed with 64 lbs. water and 16 lbs. isopropyl alcohol to produce a wet alcoholic ester phase product containing 25 lbs. isopropyl alcohol, 246.4 lbs. isopropyl esters, 0.2 lb. fatty acids and 1 lb. water. The aqueous phase produced from the final contacting stage (d) contains 64 lbs. water, 16 lbs. isopropyl alcohol and a trace of sulfuric acid.

The wet alcoholic ester product of the contacting step (d) is dried as with previous examples where anhydrous, alcohol-free product is desired. Similar desirable results are obtained producing esters with less than 0.2 wt. percent contamination by fatty acids and negligible other contamination.

EXAMPLE VII

Example V is repeated employing esters based on tertiary butyl alcohol in place of ethyl alcohol. The procedure of Example IV is typically employed as a source of esters. Similar desirable results are obtained.

EXAMPLE VIII

Example IV is repeated as a typical procedure for producing esters for the materials of Example IV and other preceding and following examples employing 37 lbs. hydrochloric acid in place of 50 lbs. sulfuric acid entering the esterification reactor and leaving the preliminary contacting stage. The esterification reaction proceeds at a higher rate permitting an average contact time ratio of 20 minutes relative to 30 minutes average residence time of the prior Exmple IV. In each instance where the prior example recited sulfuric acid as the residue from esterification, the residual acid from esterification is hydrochloric acid. The sodium sulfate content of the aqueous phase from the contacting (c) is replaced by sodium chloride. Similar desirable results of the process are obtained. Esterifications of alcohols and acids of other examples and recited herein are repeated using other esterification catalysts recited herein. Similar desirable results are obtained with the esterification products purified and identified as in the preceding examples.

EXAMPLE IX

Example V is repeated employing a different base treating material in the contacting (a). In this instance the 5 lbs. of sodium carbonate of Example V is replaced with 5 lbs. of $Na_2HPO_4$ and 5 lbs. of $Na_3PO_4$.

Similar results are obtained except that the sodium carbonate content of the aqueous phases from (a) and (b) is replaced by mixed sodium acid phosphate salts (mostly $Na_2HPO_4$). The example is repeated with other base treating materials recited herein. Similar desirable purification results are obtained.

EXAMPLE X

Example V is repeated wherein tertiary butyl esters of the fatty acid mixture as produced in the esterification operation using tertiary butyl alcohol as esterification reactants and methyl alcohol as the solvating alcohol used in the contacting steps.

In the esterification reaction on an hourly basis there is employed 740 lbs. tertiary butyl alcohol, 212 lbs. fatty acid as previously described and 50 lbs. sulfuric acid.

The crude esterification reaction product contains 260 lbs. tertiary butyl esters, 17.4 lbs. water, 50 lbs. sulfuric acid, 668.2 lbs. tertiary butyl alcohol and 6.4 lbs. fatty acid.

The crude ester is mixed in the preliminary contacting step with 100 lbs. water to provide after separation an ester phase containing 70 lbs. tertiary butyl alcohol, 1 lb. water, 6.4 lbs. fatty acid, 260 lbs. tertiary butyl esters and a trace of sulfuric acid. The aqueous phase from the preliminary contacting step includes 116.4 lbs. water, 50 lbs. sulfuric acid, and 598.2 lbs. tertiary butyl alcohol. The temperature of this and succeeding contacting steps is 70° C.

In contacting step (a) the ester phase from the preliminary step is contaced with 27 lbs. methyl alcohol, 108 lbs. water and 5 lbs. sodium carbonate to produce after separation an ester phase effluent containing 7 lbs. methyl alcohol, 50 lbs. tertiary butyl alcohol, 1 lb. water, 260 lbs. tertiary butyl esters, 0.2 lb. fatty acid, a trace of sodium soap of the fatty acids and a trace of sodium carbonate. The aqueous phase effluent from step (a) includes 20 lbs. methyl alcohol, 20 lbs. tertiary butyl alcohol, 108 lbs. water, 2 lbs. sodium carbonte, 1 lb. carbon dioxide and 7 lbs. sodium soap of the residual fatty acids.

The ester phase from contacting (a) is delivered to contacting (b) wherein it is mixed with 64 lbs. water and 16 lbs. methyl alcohol to produce after separation an ester phase containing 7 lbs methyl alcohol, 45 lbs. tertiary butyl alcohol, 1 lb. water, 260 lbs. tertiary butyl esters, 0.2 lb. fatty acid and a trace of sodium carbonate. The aqueous phase from step (b) contains 64 lbs. water, 5 lbs. tertiary butyl alcohol, 16 lbs. methyl alcohol, a trace of sodium soap and a trace of sodium carbonate.

The ester phase from contacting (b) is mixed in contacting (c) with 32 lbs. water, and 8 lbs. methyl alcohol containing a minor quantity of sulfuric acid to bring the water-alcohol-acid mixture added to a pH of about 3.0.

The effluent from contacting (c) includes an ester phase which contain 7 lbs. methyl alcohol, 40 lbs. tertiary butyl alcohol, 1 lb. water, 260 lbs. tertiary butyl esters, 0.2 lb. fatty acid and a trace of sulfuric acid. The aqueous phase from contacting step (c) includes 5 lbs. tertiary butyl alcohol, 8 lbs. methyl alcohol, 32 lbs. water, a trace of sulfuric acid and a trace of sodium sulfate.

In contacting step (d) the ester phase from the preceding step (c) is mixed with 64 lbs. water and 16 lbs. methyl alcohol and is then separated into ester and aqueous phases to produce 260 lbs. wet alcohol product ester containing 35 lbs. tertiary butyl alcohol, 0.2 lb. fatty acid and 1 lb. water. The aqueous phase from contacting (d) includes 64 lbs. water, 5 lbs. tertiary butyl alcohol, 16 lbs. methyl alcohol and a trace of sulfuric acid.

As in preceding examples the moist alcoholic esters produced by contacting step (d) are dried where desired to produce anhydrous alcohol-free esters. The products, dry and otherwise, are recovered in purified state and identified as in preceding examples.

EXAMPLE XI

Example VI is repeated substituting normal propyl alcohol for isopropyl alcohol. The esters produced and treated are normal propyl esters of the corresponding fatty acids. The residence time in the esterification reactor is reduced from 60 minutes to 45 minutes.

Similar desirable results are obtained.

EXAMPLE XII

Example V is repeated with contacting (b) and contacting (d), as such, omitted. In this example, processing otherwise through the esterification, the preliminary contacting stage and contacting (a) is substantially the same as in Example V and is at a temperature of 70° C. for the contacting steps used.

With contacting (b) omitted, contacting (c) receives the ester phase from contacting (a) which includes 20 lbs. ethyl alcohol, 232.8 lbs. ethyl esters, 1 lb. water, 0.2 lb. fatty acid, 0.2 lb. of sodium soap, and a trace of sodium carbonate. The foregoing ester phase is mixed with 16 lbs. ethyl alcohol, 64 lbs. water and 1 lb. sulfuric acid and separated to produce an ester phase effluent containing 20 lbs. ethyl alcohol, 232.8 lbs. ethyl esters, 1 lb. water, 0.4 lb. fatty acid (the acid increase coming from the sodium soap) and a trace of sulfuric acid. As in preceding examples, this aqueous alcoholic ester product is usable directly and is dried in a succeeding step to provide anhydrous product. In addition to the foregoing ester phase product, contacting step (c) provides an aqueous phase effluent containing 16 pounds ethyl alcohol, 64 lbs. water, less than 1 lb. sulfuric acid and less than 1 lb. sodium sulfate.

EXAMPLE XIII

Example III is repeated for purification of an ester having negligible contamination by residual mineral acid.

Such ester is obtainable in numerous ways, for example, from esterification processes which do not employ mineral acid or wherein the present purification process is applied to esters that have been partly purified by some prior processing. In this example, the ester feed to step (a) has an acid (residual esterification catalyst) content ranging from negligible up to about the same as the acid content of the ester phase feed to (a) of Example II. The principal effect of this is that even with the preliminary step omitted, the required amount of sodium carbonate fed to the first principal contacting step (a) is about that used in Example II and in appropriate instances even less rather than the larger amount used in Example III. Product esters of this example are substantially similar to those of the prior Example III.

EXAMPLE XIV

Prior examples are repeated for similar results using other esters and other treatment materials specifically recited in the foregoing disclosure.

What is claimed is:

1. A process for purifying a lower alkyl ester of an alkanoic acid wherein the alkyl group contains from 1 to about 6 carbon atoms and wherein the acid contains from about 6 to about 20 carbon atoms, said ester being in a phase contaminated with water insoluble organic impurity conducive to the formation of emulsions, said process comprising,
   (a) contacting the ester phase with an aqueous alcoholic solution of a base at a pH from about 11 to about 12 to react with at least part of the impurities, and separating the resulting ester phase.
   (b) contacting the ester phase produced at (a) with an aqueous alcoholic solution to remove a part of residual water soluble impurities and base remaining from step (a), and separating the resulting ester phase,
   (c) contacting the ester phase produced at (b) with an aqueous alcoholic solution of an acid having a degree of ionization between about 50 percent and 100 percent to bring the pH to from about 3 to about 5 to neutralize residual base, and separating the resulting ester phase, and
   (d) contacting the ester phase produced at (c) with an aqueous alcoholic solution to remove at least a part of the acid remaining from step (c), and separating the resulting ester phase,
the foregong operations being conducted at temperatures in the range of about 25° C. to about 125° C., the foregoing aqueous alcoholic solutions having from about 15 to about 25 percent by weight of alcohol having up to about 6 carbon atoms per molecule, the foregoing aqueous alcoholic solutions being used in proportions of from about 10 percent to about 50 percent by weight of the ester phase.

2. The process of claim 1 wherein the alkyl group is normal alkyl having from 1 to about 6 carbon atoms per radical and the alcohol used in the solutions of the treating steps has a water solubility at the temperature of the operation of at least 25 percent by weight.

3. The process of claim 1 wherein the acid is normal alkanoic having from about 8 to about 16 carbon atoms per molecule.

4. The process of claim 1 wherein the alkyl group is methyl and the alcohol used in the solutions of the contacting steps is methyl alcohol.

5. The process of claim 1 wherein the alkyl group is ethyl.

6. The process of claim 1 wherein the alkyl group is normal propyl.

7. The process of claim 1 wherein the alkyl group is isopropyl and the alcohol used in the solutions of the contacting steps is isopropyl alcohol.

8. The process of claim 1 wherein the alkyl group is normal butyl.

9. The process of claim 1 wherein the alkyl group is isobutyl.

10. The process of claim 1 wherein the alkyl group is secondary butyl.

11. The process of claim 1 wherein the acid is hexanoic acid.

12. The process of claim 1 wherein the acid is octanoic acid.

13. The process of claim 1 wherein the acid is dodecanoic acid.

14. The process of claim 1 wherein the acid is tetradecanoic acid.

15. The process of claim 1 wherein the acid is hexadecanoic acid.

16. The process of claim 1 wherein $Na_2CO_3$ is the base of step (a).

17. The process of claim 1 wherein the acid of step (c) is $H_2SO_4$.

18. The process of claim 1 wherein the alcohol of the solutions of the contacting steps consists essentially of alcohol whose alkyl group is that of the ester.

References Cited

UNITED STATES PATENTS 2,666,781  1/1954  Ford _____ 260—468

ELBERT L. RUBERIS, Primary Examiner
E. G. LOVE, Assistant Examiner

U.S. Cl. X.R.
260—499

PO-1050
(5/69)

UNITED STATES PATENT OFFICE
CERTIFICATE OF CORRECTION

Patent No. 3,578,689              Dated May 11, 1971

Inventor(s) Eugie A. Martin et al

It is certified that error appears in the above-identified patent and that said Letters Patent are hereby corrected as shown below:

Column 1, line 41, reads "RO", should read -- RC --. Column 3, line 6, reads "isobctyl", should read -- isobutyl --. Column 4, line 63, reads "descirbed", should read -- described --. Column 5, line 23, reads "aqeous", should read -- aqueous --. Column 7, lines 51 and 52, reads "such produced", should read -- such as produced --; line 56, reads "startification", should read -- stratification --. Column 8, line 69, reads "that Example", should read -- that of Example --. Column 9, line 37, reads "basic", should read -- basis --; line 61, reads "form", should read -- from --. Column 10, line 40, reads "separted", should read -- separated --; line 55, reads "1 lbs.", should read -- 1 lb. --; line 67, reads "phse", should read -- phase --. Column 11, line 50, reads "as", should read -- are --; line 72, reads "contaced", should read -- contacted --.

Signed and sealed this 11th day of April 1972.

(SEAL)
Attest:

EDWARD M. FLETCHER, JR.
Attesting Officer

ROBERT GOTTSCHALK
Commissioner of Patents